(12) United States Patent
Hopf

(10) Patent No.: US 10,199,831 B2
(45) Date of Patent: Feb. 5, 2019

(54) CIRCUIT ARRANGEMENT FOR INLINE VOLTAGE SUPPLY, USE OF SUCH A CIRCUIT ARRANGEMENT AND DEVICE HAVING SUCH A CIRCUIT ARRANGEMENT

(71) Applicant: SMA Solar Technology AG, Niestetal (DE)

(72) Inventor: Markus Hopf, Espenau (DE)

(73) Assignee: SMA Solar Technology AG, Niestetal (DE)

(*) Notice: Subject to any disclaimer, the term of this patent is extended or adjusted under 35 U.S.C. 154(b) by 118 days.

(21) Appl. No.: 14/969,278

(22) Filed: Dec. 15, 2015

(65) Prior Publication Data
US 2016/0099573 A1   Apr. 7, 2016

Related U.S. Application Data

(63) Continuation of application No. PCT/EP2014/062767, filed on Jun. 17, 2014.

(30) Foreign Application Priority Data

Jun. 28, 2013  (DE) .......................... 10 2013 106 808

(51) Int. Cl.
*H02M 7/44*        (2006.01)
*H02J 3/38*        (2006.01)
(Continued)

(52) U.S. Cl.
CPC .............. *H02J 3/383* (2013.01); *H02J 1/06* (2013.01); *H02M 3/04* (2013.01); *H02M 7/44* (2013.01); *H02S 50/00* (2013.01); *Y02E 10/563* (2013.01)

(58) Field of Classification Search
CPC ............ H02J 3/383; H02J 3/385; H02M 3/04; H02M 3/06; H02M 3/07; H02M 3/08;
(Continued)

(56) References Cited

U.S. PATENT DOCUMENTS 4,716,301 A * 12/1987 Willmott ................... G05F 1/59
                                                                307/115
7,864,497 B2    1/2011 Quardt et al.
(Continued)

FOREIGN PATENT DOCUMENTS

| JP | H0380315    | * | 8/1991 |
| JP | H0380315 U  |   | 8/1991 |
| JP | 2009153339 A|   | 7/2009 |
| WO | 2006125664 A1|  | 11/2006|

*Primary Examiner* — Patrick Chen
(74) *Attorney, Agent, or Firm* — Eschweiler & Potashnik, LLC

(57) ABSTRACT

In a circuit arrangement for in-line supply of voltage to an electrical or electronic apparatus located in the region of a DC line, a parallel circuit of two diodes oriented in anti-parallel is arranged in the line. When a direct current is flowing between terminals of the circuit arrangement, the anti-parallel diodes permit a small voltage drop between the terminals, irrespective of the direction of flow of the current, which voltage drop is limited to the forward voltage of the diode that is currently forward biased. The voltage drop across the anti-parallel diodes is tapped by a supply subcircuit. A semiconductor switch can be connected in parallel with the anti-parallel diodes, which switch is controlled by a voltage-reduction subcircuit to minimize the power dissipation of the circuit arrangement.

16 Claims, 2 Drawing Sheets

(51) Int. Cl.
*H02J 1/06* (2006.01)
*H02M 3/04* (2006.01)
*H02S 50/00* (2014.01)

(58) Field of Classification Search
CPC ..... H02M 2003/075; H02M 2003/076; H02M 2003/077; H02M 2003/078; H02M 3/10; H02M 3/125; H02M 3/13–3/15; H02M 3/155; H02M 3/156; H02M 3/1563; H02M 3/157; H02M 3/158–3/1584; H02M 3/1588; H02M 2003/1552; H02M 2003/1555; H02M 2003/1557; H02M 2003/1566; H02M 2003/1586
USPC .......................................................... 307/52
See application file for complete search history.

(56) References Cited

U.S. PATENT DOCUMENTS

| | | | |
|---|---|---|---|
| 8,488,812 B2* | 7/2013 | David | G05F 1/467 |
| | | | 381/111 |
| 2008/0198523 A1 | 8/2008 | Schmidt et al. | |
| 2010/0246859 A1* | 9/2010 | David | H02M 3/07 |
| | | | 381/120 |
| 2011/0279937 A1 | 11/2011 | Signorelli et al. | |
| 2011/0319755 A1* | 12/2011 | Stein | A61B 5/0031 |
| | | | 600/437 |
| 2012/0019303 A1* | 1/2012 | Singh | H02M 1/14 |
| | | | 327/333 |
| 2012/0087161 A1* | 4/2012 | Stahlhut | H02M 1/096 |
| | | | 363/54 |

* cited by examiner

CIRCUIT ARRANGEMENT FOR INLINE VOLTAGE SUPPLY, USE OF SUCH A CIRCUIT ARRANGEMENT AND DEVICE HAVING SUCH A CIRCUIT ARRANGEMENT

CROSS REFERENCE TO RELATED APPLICATIONS

This application claims priority to International Patent Application number PCT/EP2014/062767, filed on Jun. 17, 2014, which claims priority to German Patent Application number 10 2013 106 808.1, filed on Jun. 28, 2013, and is hereby incorporated by reference in its entirety.

FIELD

The disclosure relates to a circuit arrangement which is suitable for the in-line supply of voltage to an electrical or electronic apparatus located in the region of a DC line.

BACKGROUND

In principle, for the in-line supply of voltage to an electrical or electronic apparatus located in the region of a DC line, it is possible to arrange in the line an electrical component having an electrical resistance. The voltage drop produced by this electrical resistance could be used directly or after stepping-up for the in-line voltage supply.

WO 2006/125664 A1 discloses a circuit breaker. The circuit breaker is intended for a solar module in which a plurality of solar cells are connected in series, some of which are operating normally while some are operating in shadow. The circuit breaker can be connected in parallel with the plurality of solar cells to form a bypass path. In addition to a bypass diode, which is standard practice in this position in solar modules, the circuit breaker comprises a semiconductor switch connected in parallel with the bypass diode, the intrinsic freewheeling diode of which switch is oriented parallel to the bypass diode, i.e. the two diodes have the same forward-bias and reverse-bias directions along the bypass path. The semiconductor switch is driven to open when the parallel bypass diodes conduct a current in the forward-bias direction in order to reduce the power dissipation occurring in the bypass diode and associated heat generation. A supply circuit for providing the control voltage for the semiconductor switch is designed as a charging circuit for an energy store, which circuit steps up a voltage available across the bypass diode during shadow to a higher voltage for driving the semiconductor switch. The intention is to be able to use the supply voltage available across the bypass diode during shadow not only to drive the controllable bypass element but also to supply further circuits.

US 2011/0279937 A1 discloses a circuit breaker in which there is a MOSFET containing a freewheeling diode. The circuit breaker comprises a control circuit for controlling the MOSFET. The control circuit includes, inter alia, a series circuit which consists of a resistor, a diode and a capacitor and is connected in parallel with the MOSFET. The diode in the series circuit allows a current flow in the forward-bias direction of the diode for the purpose of charging the capacitor, while preventing a current flow in the opposite direction, which would discharge the capacitor again. The voltage drop across the capacitor thereby provides a supply voltage for supplying voltage to the control circuit.

SUMMARY

In a circuit arrangement according to the disclosure comprising a diode disposed in a line, and comprising a supply subcircuit that taps the voltage drop across the diode, and a further diode connected in parallel with the diode, the forward-bias directions of the diode and the further diode are oriented anti-parallel to each other.

The two diodes oriented in anti-parallel ensure that the voltage drop across the circuit arrangement according to the disclosure in the DC line remains small irrespective of the direction of flow of the direct current. This can be used in the circuit arrangement according to the disclosure to provide reverse-polarity protection for terminals for incorporating the circuit arrangement in the DC line. In any case, however, the two diodes in the circuit arrangement according to the disclosure provide mutual protection against relatively large voltages in their respective reverse-bias directions. This means that diodes that have only a low breakdown voltage can be used for the circuit arrangement even when the DC line is carrying a large current whose direction may reverse temporarily. This type of reversal of the flow direction of a direct current, i.e. an instance of what is known as a reverse current, can arise for example in the supply lines of a photovoltaic generator when it is in shadow unlike other photovoltaic generators connected in parallel.

The supply subcircuit that taps the voltage drop across the diodes is also protected against relatively large voltages by the anti-parallel arrangement of the diodes. It can therefore have a relatively low-cost design. The supply subcircuit is provided in the circuit arrangement according to the disclosure and has the function of supplying a voltage to another electrical or electronic apparatus.

The described action of the two anti-parallel diodes results from the direct parallel circuit of the two diodes in the DC line. Neither of the two anti-parallel diodes should in this case be connected inside their parallel circuit in series with a component which impedes the flow of the direct current significantly more than the forward resistance of the two diodes. This ensures that the supply subcircuit tapping the voltage drop is protected from relatively large voltages and hence from damage to its components. When using the cheapest possible components for the supply subcircuit, it is generally possible according to the disclosure to rule out damage to the components if the total voltage drop across the diodes in normal operation does not exceed a value of 5 V. In particular this rules out a capacitor or a further diode whose forward-bias direction is opposite to an electrical element connected in series with one of the two anti-parallel diodes, whereas it does not rule out in principle, for instance, a shunt resistor used for current measurement.

On the other hand, the supply subcircuit which taps the voltage drop across the diodes requires a minimum value for the voltage drop. If this minimum value does not exist at least for a limited time period during start-up of the supply subcircuit—at a rate when this subcircuit is implemented using components available at low cost—it is not guaranteed that the supply subcircuit will start up correctly. When diodes are available that have a suitable forward voltage, the minimum value for the voltage drop across the anti-parallel diodes can even be met when just two diodes, each having one pn junction, are connected in parallel in the DC line. If, however, diodes that have the desired forward voltage are unavailable or only available at high cost, then in principle one or each of the two diodes arranged in anti-parallel can also consist of a series circuit of two or more sub-diodes having the same forward-bias direction and each having one pn junction. This increases the voltage drop across the diode that is currently forward-biased to the sum of the forward voltages of the sub-diodes. This allows low-cost yet sufficiently precise adjustment of the required voltage drop. It is also possible to replace a sub-diode inside one or both series circuits of sub-diodes with another electrical component which during operation produces a comparable voltage drop to the corresponding forward-biased sub-diode.

In one embodiment the circuit arrangement according to the disclosure also comprises a semiconductor switch which is connected in parallel with the diodes and is controlled by a voltage-reduction subcircuit. This semiconductor switch is likewise protected against relatively large voltages by the anti-parallel arrangement of the diodes. Thus it can also have a relatively low-cost design because although it must be designed for the direct current flowing in the line it does not also need to be designed concurrently to have a high breakdown voltage. This semiconductor switch can be used to reduce further the voltage drop across the anti-parallel diodes, which equals the forward voltage of the diode that is currently forward biased, in order to reduce the power dissipation occurring in the forward-biased diode. The switch is controlled by the voltage-reduction subcircuit for this purpose. The voltage-reduction subcircuit is supplied by the supply subcircuit, although it shall be understood that the voltage-reduction subcircuit is not the only electrical or electronic apparatus supplied by the supply subcircuit.

The voltage-reduction subcircuit controls the semiconductor switch to reduce the voltage in particular when the supply subcircuit would manage with a lower voltage drop across the diode. Thus by controlling the semiconductor switch by the voltage-reduction subcircuit, this voltage can be kept very small according to the power required by the electrical or electronic apparatus. The heat dissipated at the location of the two diodes can hence be minimized.

The diode or the further diode of the circuit arrangement according to the disclosure may be an intrinsic freewheeling diode, also known as a body diode, of the semiconductor switch. It is also possible, however, to provide the diode and the further diode in addition to the semiconductor switch even if the switch comprises a body diode, for instance in order to specify the properties of the diode and of the further diode. The semiconductor switch may be a MOSFET semiconductor switch, for example.

In future it may be possible to use in conjunction with the semiconductor switch and the voltage-reduction subcircuit controlling the switch, a varistor or a suppressor diode instead of the diodes connected in anti-parallel. Varistors and suppressor diodes that are currently available, however, tend to be unsuitable or disadvantageous in this situation because they have relatively high threshold voltages or breakdown voltages compared with the forward voltages of diodes and hence involve correspondingly higher voltage loads of the components connected in parallel as well as higher power losses. Thus the parallel-connected semiconductor switch would also have to be designed for higher voltage values, which would then in turn also make this component more expensive and overall would be ineffective.

The supply subcircuit of the circuit arrangement according to the disclosure can comprise a temporary energy store for electrical energy. This may be a DC link fed by a DC/DC converter in the supply subcircuit. In particular the DC/DC converter may be a step-up converter, which steps up the voltage drop across the diode(s) to a required supply voltage in the DC link. The voltage-reduction subcircuit, if present, and in any event the electrical or electronic apparatus, can then be supplied with electrical energy from the DC link.

If the DC/DC converter of the circuit arrangement according to the disclosure charges the DC link with a fixed polarity irrespective of the polarity of the voltage drop across the diodes, the circuit arrangement according to the disclosure can be arranged in any orientation in the DC line, or in other words it continues to work even when there is a change in the direction of flow of the direct current through the line.

The supply subcircuit of the circuit arrangement according to the disclosure can also comprise other or additional temporary energy stores. Thus, for example, in addition to the above-described DC link, an additional temporary energy store can be provided that is supplied by the same DC/DC converter. The additional energy store may be, for instance, a super capacitor (electric double-layer capacitor, pseudo-capacitor or hybrid capacitor) or a rechargeable battery. The additional temporary energy store has the advantage that the supply subcircuit continues to provide the supply even in the prolonged absence of a current flow through the DC line. The additional temporary energy store can be recharged on resumption of the current flow. In addition to or as an alternative to a rechargeable additional temporary energy store it is also possible to use an additional energy store that is not rechargeable i.e. in the form of a non-rechargeable battery. This may provide battery backup for a clock, for instance, in order to generate a time stamp for sensor data if applicable. When a non-rechargeable additional energy store is used, it is not supplied by the DC/DC converter and must be replaced when discharged.

The voltage-reduction subcircuit of the circuit arrangement according to the disclosure can control the semiconductor switch according to a charge level of the temporary energy store. Specifically, the voltage-reduction subcircuit can be designed, for example, so that the semiconductor switch closes at least partially when the DC link is charged to a defined DC link voltage. This defined DC link voltage indicates that sufficient electrical energy is available in the DC link as the temporary energy store. Conversely, the voltage-reduction subcircuit can be designed to re-open the semiconductor switch at least partially when the DC link has discharged to a lower defined DC link voltage.

Alternatively, the voltage-reduction subcircuit of the circuit arrangement according to the disclosure can also control the semiconductor switch such that a voltage drop across the diodes is controlled to a constant value below the forward voltages of the diodes irrespective of a current flowing inside the line.

A circuit arrangement according to the disclosure is provided in particular for the in-line supply of voltage to an electrical or electronic apparatus located in the region of a DC line. The current-carrying line may be in particular one of two supply lines of a photovoltaic generator, through which line a comparatively large current flows and through which there may also arise reverse currents.

In a device according to the disclosure comprising an electrical or electronic apparatus and a circuit arrangement according to the disclosure, the circuit arrangement according to the disclosure comprises terminals for arranging the diode of the circuit arrangement in a DC line. Since the diode, the further diode and the semiconductor switch are connected in parallel, they are also then essentially in the current-carrying line.

The electrical or electronic apparatus of the device according to the disclosure can comprise in particular at least one sensor, for example a temperature sensor, a sensor for detecting the light intensity (light sensor), a sensor for determining the wind strength or such like. It is then also referred to as a sensor box.

In addition, the electrical or electronic apparatus of the device according to the disclosure can comprise a communications interface, via which it communicates with a remotely situated apparatus, for instance an apparatus for analyzing values measured by the sensor(s).

The communications interface may comprise, for example, a transformer for power-line communication over the DC line, one winding of which transformer is connected between the terminals in series with the diode. The one winding of the transformer is hence also connected in series with the further diode and the semiconductor switch, which are arranged in parallel with the diode.

The claims, description and drawings contain advantageous developments of the disclosure. The advantages associated with features and combinations of features and stated in the description are merely by way of example, and advantages may be effected in an alternative or cumulative manner without necessarily being achieved by embodiments according to the disclosure. The following statement applies to the disclosure of the original application documents and the patent without modifying the subject matter of the accompanying claims: further features can be found in the drawings, in particular from the depicted relative arrangement and operative connection of a plurality of components. Features of different embodiments of the disclosure or features of different claims can likewise be combined differently from the chosen dependency references of the claims, and this combination is hereby suggested. This also applies to those features that are depicted in separate drawings or mentioned in the description of said drawings. These features may also be combined with features of different claims. Likewise, features presented in the claims may be omitted for other embodiments of the disclosure.

It shall be understood that in terms of their number, the features mentioned in the claims and in the description shall exist in precisely this number or in a larger number than the number specified, without the adverb "at least" needing to be used explicitly. For instance if an element is mentioned, then this shall be understood to mean that there is one element or there are two or more elements. Further features may be added to these features, or these features may be the only features that make up the product concerned.

The reference signs contained in the claims do not restrict the scope of the subject matter protected by the claims, but are used merely for the purpose of making the claims easier to understand.

BRIEF DESCRIPTION OF THE DRAWINGS

Further explanations and descriptions of the disclosure are given below with reference to preferred embodiments shown in the figures.

DETAILED DESCRIPTION

The disclosure relates to a circuit arrangement which is suitable for the in-line supply of voltage to an electrical or electronic apparatus located in the region of a DC line.

An in-line voltage supply shall be understood to mean that the circuit arrangement taps electrical energy from the DC line without using an external reference potential. The electrical or electronic apparatus may be a sensor, for example, which detects a physical value in the region of the DC line, for instance a value such as a temperature, and which in particular needs electrical energy to measure the physical value and to transmit same to a remote receiver.

A circuit arrangement according to the disclosure shall be suitable in particular for the in-line supply of voltage to an electrical or electronic apparatus located in the region of the supply lines of a photovoltaic generator, for instance in order to use a sensor to measure at least one physical value that describes the operating status of the photovoltaic generator, and to transmit the value to a monitoring unit.

Figure 1:
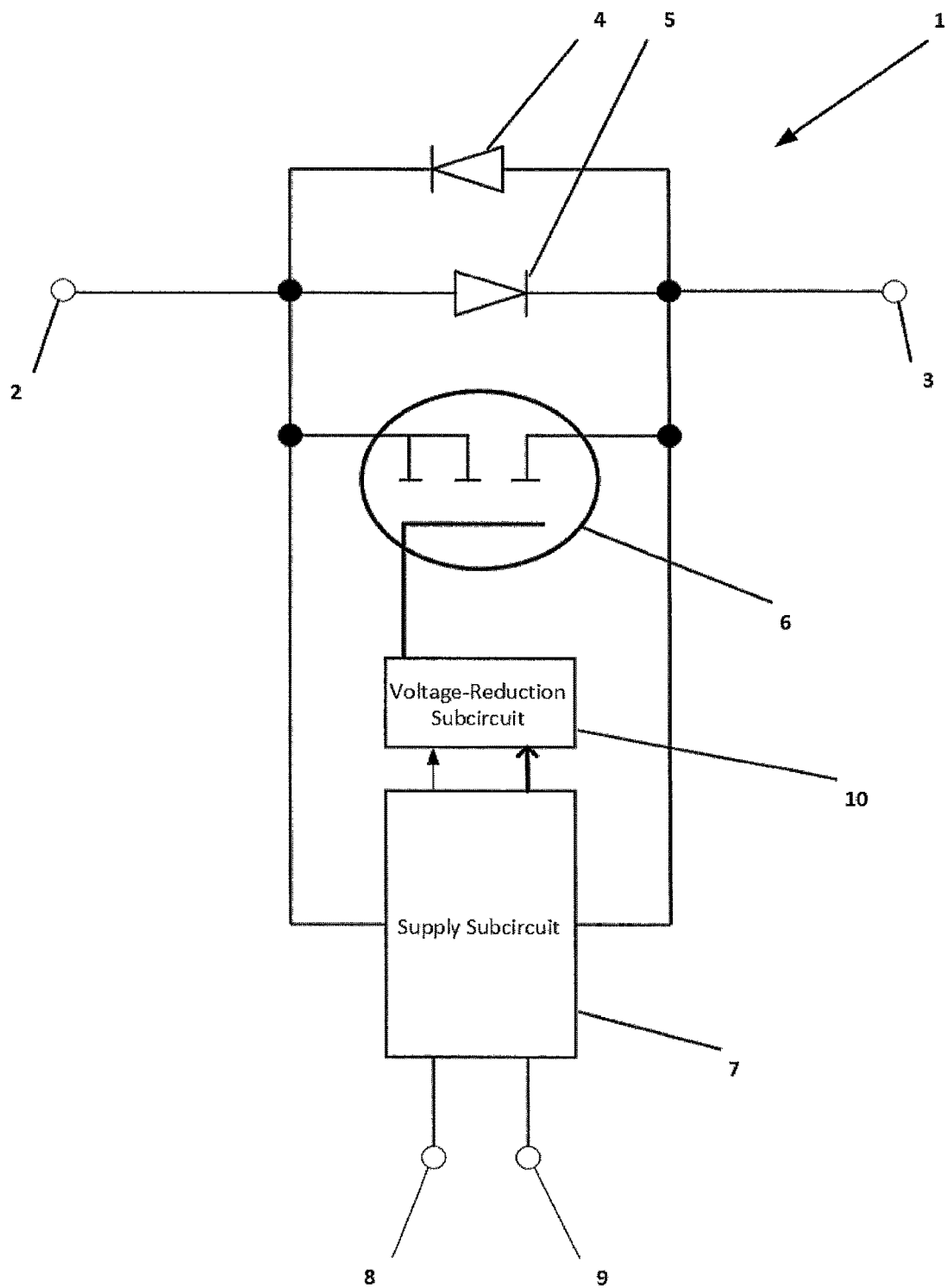
FIG. 1 shows a circuit arrangement according to the disclosure.

The circuit arrangement 1 shown in FIG. 1 comprises two terminals 2 and 3 for arranging the circuit arrangement 1 in a DC line. A diode 4, a further diode 5, a semiconductor switch 6 and an input to a supply subcircuit 7 are connected in parallel between the terminals 2 and 3. The diodes 4 and 5 between the terminals 2 and 3 have opposite forward-bias directions from each other. This arrangement is also referred to as anti-parallel in this context. When a direct current is flowing between the terminals 2 and 3, the anti-parallel diodes 4 and 5 permit a small voltage drop between the terminals 2 and 3, irrespective of the direction of flow of the current, which voltage drop equals the forward voltage of the diode 4 or 5 that is currently forward biased. This voltage is tapped by the supply subcircuit 7 in order to generate therefrom a supply voltage between two output terminals 8 and 9. The output voltage between the output terminals 8 and 9 is normally higher than the voltage drop between the terminals 2 and 3. In addition, the supply subcircuit 7 usually comprises a temporary energy store (not shown here). When this temporary energy store is in the charged state, the voltage drop between the terminals 2 and 3 is no longer needed, and were it to be maintained it would result accordingly in unnecessary power dissipation in the circuit arrangement 1. In order to reduce this power dissipation, the semiconductor switch 6 is provided, which here is in the form of a MOSFET. The semiconductor switch 6 is assigned a voltage-reduction subcircuit 10, which is supplied by the supply subcircuit 7 and which closes the semiconductor switch 6 at least partially when the temporary energy store of the supply subcircuit 7 is sufficiently charged. In a corresponding manner, the voltage-reduction subcircuit 10 reopens the semiconductor switch 6 at least partially if the charge level of the temporary energy store of the supply subcircuit 7 has dropped to below a certain minimum value. Therefore FIG. 1 uses different arrows to indicate two connections between the voltage-reduction subcircuit 10 and the supply subcircuit 7 which are provided for the supply and the information about the charge level of the temporary energy store. The at least partially closed semiconductor switch 6 provides a bypass path to the anti-parallel diodes 4 and 5, via which path the current can flow between the terminals 2 and 3 with lower resistance and correspondingly lower power dissipation. The anti-parallel diodes 4 and 5 protect the semiconductor switch 6, but also themselves, from relatively large voltages between the terminals 2 and 3. In order to ensure that a large current can flow between the terminals 2 and 3, it is sufficient to design all the semiconductor components 4 to 6 overall for this large current. There is no need, however, for these components also to have a concurrent design for a relatively large voltage in the reverse direction, because the anti-parallel connection of the diodes means that large voltages cannot occur. It holds that there is never a voltage greater than the forward voltage of the diodes 4 and 5 across the inputs of the supply subcircuit 7. The entire circuit arrangement 1 can accordingly be made from semiconductor components that have only a low voltage class and hence are available at correspondingly low cost.

Figure 2:
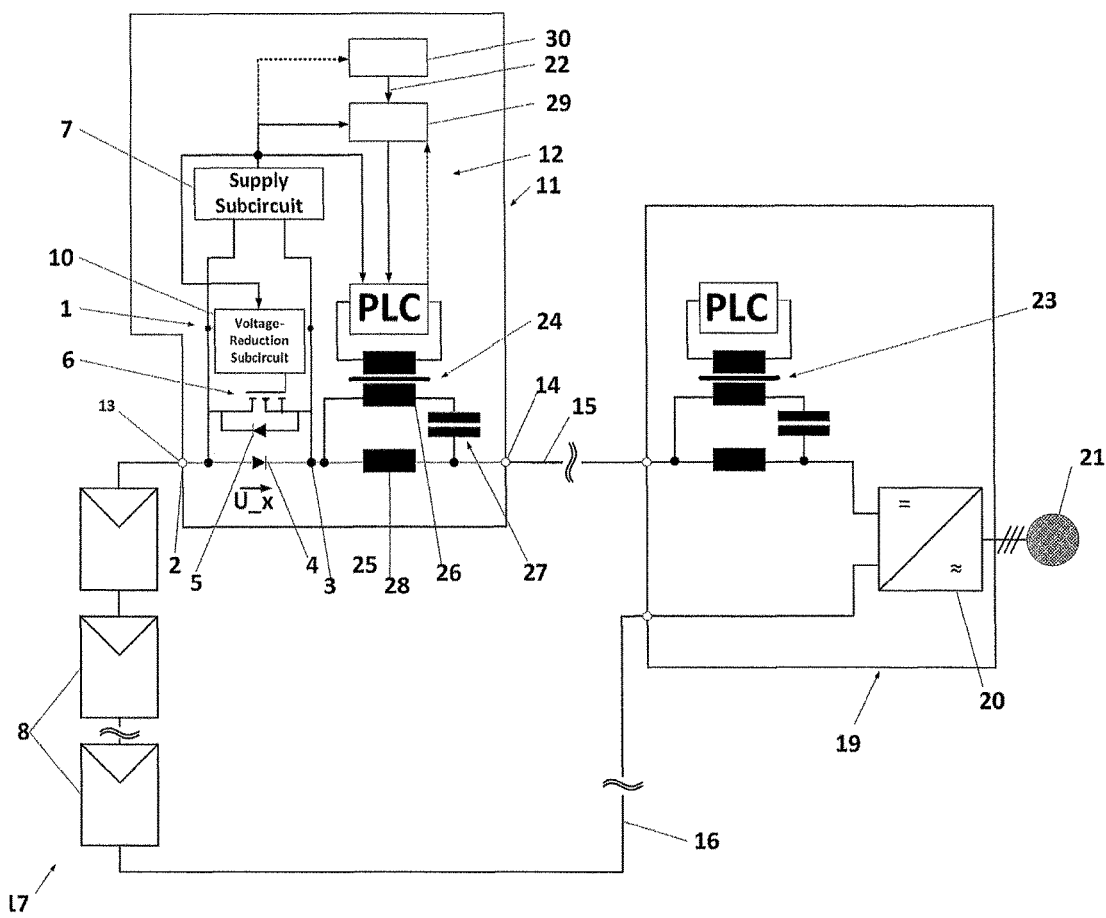
FIG. 2 shows a device according to the disclosure comprising a circuit arrangement according to the disclosure being used in a photovoltaic installation.

FIG. 2 shows a device 11 comprising a circuit arrangement 1 and an electronic apparatus 12, which is supplied with voltage, i.e. electrical energy, by the circuit arrangement 1. The device 11 is arranged via terminals 13 and 14 in a DC line 15. The line 15 is one of two supply lines 15 and 16 of a photovoltaic generator 17 comprising a plurality of series-connected photovoltaic modules 18. The photovoltaic generator 17 is connected to an inverter 19 via the supply lines 15 and 16. The inverter 19 comprises a DC/AC converter 20, which is used to feed electrical energy from the photovoltaic generator 17 into an AC power grid 21. The inverter 19 comprises a communications interface 23 for power-line communication (PLC) with the device 11, specifically with the electronic apparatus 12 of the device. The electronic apparatus 12 comprises a communications interface 24 that corresponds to the communications interface 23. The communications interface 24 comprises a transformer 25, one winding 26 of which is connected between the terminals 13 and 14 in series with the circuit arrangement 1. More precisely, the winding 26 is connected in series with a capacitor 27, this series circuit is connected in parallel with an inductor 28, and this parallel circuit is in turn connected in series with the circuit arrangement 1 between the terminals 13 and 14. This type of circuit provides a path for the radio frequency PLC signals via the inductor 26 and the capacitor 27, and an additional path for the direct current via the inductor 28. Hence the original DC line is split effectively into an RF path and a DC path. This allows a small and low-cost design for the transformer 25. An additional capacitor can optionally be arranged in parallel with the inductor 28. This capacitor then acts together with the inductor 28 as a bandpass filter, which can be designed for signals at the PLC frequency so that these signals can be selectively diverted. The communications interface 24 can also be constructed without the transformer 25, in which case the PLC signal is then tapped and applied respectively directly across the capacitor 27.

The supply subcircuit 7 supplies the communications interface 24 with electrical energy, which is indicated here merely by an arrow. For the purpose of two-way communication, the communications interface 24 is connected to a microprocessor 29, which in turn receives measured values 22 from a sensor 30. The supply subcircuit 7 also supplies the microprocessor 29 and the sensor 30 with electrical energy. The microprocessor 29 processes the measured values 22 from the sensor 30 and communicates same to the inverter 19 via the communications interface 24, the line 15 and the communications interface 23.

The depicted communications interface 24 in the form of a power-line communication unit, the sensor 30, which is not described in greater detail, and the microprocessor 29 are simply examples of electronic apparatuses 12 that are supplied by the supply subcircuit 7 with electrical energy taken from the direct current flowing in the line 15. Alternatively and/or cumulatively, the supply subcircuit 7 can also supply electronic apparatuses 12 other than those depicted. For example, a communications interface 24 that communicates information on the basis of radio transmission is also possible as an alternative to the depicted communications interface 24 in the form of a power-line communication unit.

It is indicated in FIG. 2 for the voltage-reduction subcircuit 10 that this subcircuit also taps the voltage drop across the anti-parallel diodes 4 and 5 directly in order to adjust this voltage to a specific value below the forward voltage of the currently forward-biased diode by controlling the semiconductor switch 6 according to the charge level of the temporary energy store of the power supply subcircuit 7, or even regardless thereof. In order to reduce the forward voltage, the semiconductor switch 6 may be controlled, for example, to a voltage drop that is constant over time and is smaller than the forward voltage of the forward-biased diode. The constant voltage drop can be selected so that a sufficient flow of energy into the temporary energy store is nonetheless still possible. It is also possible that when there is sufficient energy available in the temporary energy store, the semiconductor switch 6 is switched fully on at least temporarily in order to reduce the power dissipation across the diodes to a minimum value at least temporarily.

During the time period in which the semiconductor switch 6 is switched fully on, it is not possible to recharge the temporary energy store. As a result of the electrical power that is needed to supply the electronic apparatuses 12 flowing out of the temporary energy store, the temporary energy store discharges in the time period that the semiconductor switch 6 is switched fully on. This results in a varying charge level of the temporary energy store. The semiconductor switch 6 can also be driven under closed-loop control such that the charge level of the temporary energy store is used as the input variable for the control system, thereby keeping the temporary energy store at a defined level. This defined level may be a constant value over time, although it may also consist of a value pair in the form or a lower and upper tolerance limit. In the latter case, the actual value of the charge level of the temporary energy store varies between the upper and lower tolerance value. With regard to the semiconductor switch 6, FIG. 2 indicates that the further diode 5 is in the form of the intrinsic freewheeling diode or body diode of the switch. The diode 4 is here oriented in the usual direction of flow of the direct current through the line 15.

The device 11 can be incorporated in the line 15 at any point along the line 15 without any great complexity. In particular, the device 11 can be positioned further away from the inverter 19, i.e. close to the photovoltaic generator 17. Fitting the device 11 is particularly easy if a plug/socket connection already exists near the planned installation position. This can be disconnected easily and connected to each side of the device 11. The device 11 is supplied in-line from the current flowing through the line 15, i.e. without an additional external reference potential or connection to the other supply line 16 of the photovoltaic generator 17. Although power is dissipated in the diode 4, 5 through which the current is currently flowing or semiconductor switch 6 through which the current is flowing, this power dissipation is limited to the level needed to supply the electronic apparatus 12 by minimizing the voltage drop across the anti-parallel diodes 4 and 5 by appropriate control of the semiconductor switch 6.

The invention claimed is:

1. A circuit arrangement, comprising:
  a diode disposed in a direct current (DC) supply line of a generator, wherein the diode forms a first terminal and a second terminal of the circuit arrangement;
  a supply subcircuit connected in parallel to the diode, wherein the supply subcircuit is configured to receive an input voltage that is generated across the diode when direct current flows in the supply line and to generate a supply voltage from the input voltage; and
  a further diode connected in parallel with the diode, wherein forward-bias directions of the diode and of the further diode are oriented anti-parallel to each other,
  wherein when a direct current is flowing from the first terminal to the second terminal the input voltage received by the supply subcircuit is limited to the forward voltage of the diode and when a direct current is flowing from the second terminal to the first terminal the input voltage received by the supply subcircuit is limited to the forward voltage of the further diode.

2. The circuit arrangement according to claim 1, further comprising a semiconductor switch connected in parallel with the anti-parallel diodes and controlled by a voltage-reduction subcircuit of the circuit arrangement.

3. The circuit arrangement as claimed in claim 2, wherein the diode or the further diode comprises an intrinsic free-wheeling diode of the semiconductor switch.

4. The circuit arrangement as claimed in claim 2, wherein the supply subcircuit comprises a temporary energy store, and wherein the voltage-reduction subcircuit controls the semiconductor switch according to a charge level of the temporary energy store.

5. The circuit arrangement as claimed in claim 2, wherein the voltage-reduction subcircuit controls the semiconductor switch such that a voltage drop across the anti-parallel diodes is controlled to a constant value irrespective of a current flowing inside the DC supply line.

6. The circuit arrangement as claimed in claim 1, wherein the supply subcircuit comprises a temporary energy store that is charged by the voltage drop across the diode.

7. The circuit arrangement as claimed in claim 6, wherein the supply subcircuit comprises a DC link as the temporary energy store and further comprises a DC/DC converter that supplies the DC link.

8. The circuit arrangement as claimed in claim 7, wherein the DC/DC converter comprises a step-up converter.

9. The circuit arrangement as claimed in claim 7, wherein the DC/DC converter is configured to charge the DC link with a fixed polarity.

10. The circuit arrangement as claimed in claim 7, wherein the DC/DC converter is configured to step up the voltage drop across the diode to a supply voltage in the DC link.

11. The circuit arrangement as claimed in claim 6, wherein the supply subcircuit comprises a super capacitor or a rechargeable battery as the temporary energy store.

12. The circuit arrangement as claimed in claim 1, wherein the supply voltage comprises an in-line supply of voltage to an electrical or electronic apparatus located in the region of the DC supply line.

13. A device comprising an electrical or electronic apparatus and comprising a circuit arrangement, the circuit arrangement comprising:
   a diode disposed in a direct current (DC) supply line of a generator, wherein the diode forms a first terminal and a second terminal of the circuit arrangement;
   a supply subcircuit connected in parallel with the diode, wherein the supply subcircuit is configured to receive an input voltage that is generated across the diode when direct current flows in the supply line and to generate a supply voltage from the input voltage; and
   a further diode connected in parallel with the diode, wherein forward-bias directions of the diode and of the further diode are oriented anti-parallel to each other,
   wherein when a direct current is flowing from the first terminal to the second terminal the input voltage received by the supply subcircuit drop is limited to the forward voltage of the diode and when a direct current is flowing from the second terminal to the first terminal the input voltage received by the supply subcircuit drop is limited to the forward voltage of the further diode,
   wherein the first terminal and the second terminal are configured to couple the circuit arrangement into the DC supply line.

14. The device as claimed in claim 13, wherein the electrical or electronic apparatus comprises at least one sensor.

15. The device as claimed in claim 13, wherein the electrical or electronic apparatus comprises a communications interface.

16. The device as claimed in claim 15, wherein the communications interface comprises a transformer for power-line communication over the DC supply line, one winding of which transformer is connected between the terminals in series with the diode.

* * * * *